Patented Sept. 9, 1930

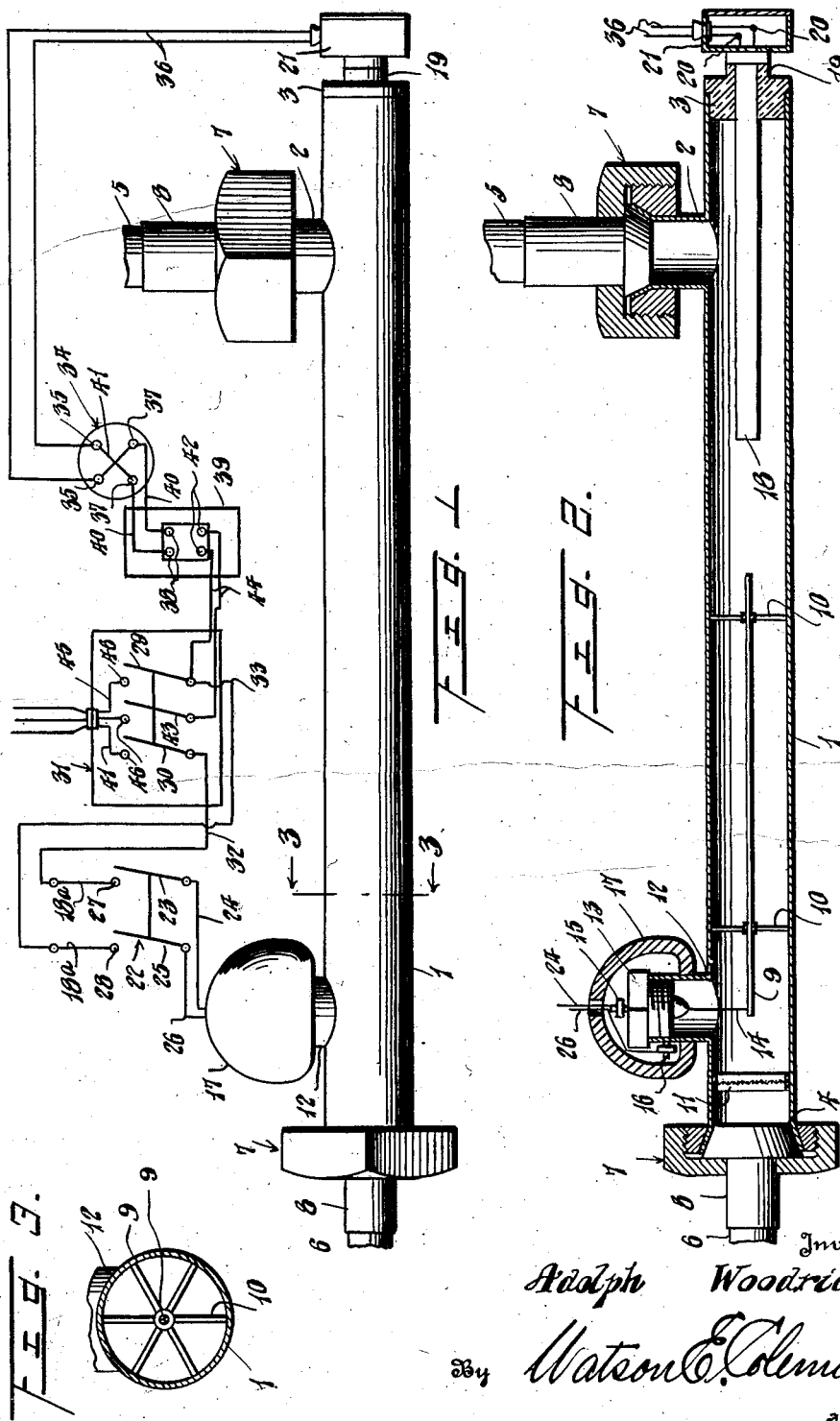

1,775,579

UNITED STATES PATENT OFFICE

ADOLPH WOODRICH, OF KLAMATH FALLS, OREGON

MILK-STERILIZING APPARATUS

Application filed September 12, 1929. Serial No. 392,233.

This invention relates to an apparatus for sterilizing liquids, and has for one of its objects to provide a novel and simple apparatus of this character which shall be especially adapted to be used for the purpose of destroying bacteria in milk and which shall be adapted to effect the destruction of the bacteria during the passage of the milk from the receiving vat to the cooler of a bottling apparatus.

The invention has for a further object to provide a sterilizing apparatus of the character stated which shall be adapted to employ electric current for the purpose of destroying the bacteria and which shall be adapted to stimulate the bacteria so as to enable their ready destruction by the electric current.

The invention has for a further object to provide a sterilizing apparatus of the character stated wherein the stimulating means shall be in the form of an electric heater and adapted to effect the stimulation of the bacteria prior to the action thereon of the electric current.

The invention has for a still further object to provide a sterilizing apparatus of the character stated which shall be adapted to be easily and quickly arranged in the pipe line extending from the vat to the cooler of the milk bottling apparatus.

With the foregoing and other objects in view, the nature of which will appear as the description proceeds, the invention consists in the construction, combination and arrangement of parts hereinafter fully described and claimed, and illustrated in the accompanying drawing, wherein:—

Figure 1 is a view illustrating the apparatus in side elevation and illustrating diagrammatically the means for controlling the supply of current to the electrodes and heater of the apparatus;

Figure 2 is a sectional view taken on a plane extending vertically and longitudinally through the apparatus; and Figure 3 is a sectional view taken on the vertical plane indicated by the line 3—3 of Figure 2.

The sterilizing apparatus comprises a tube 1 which may be made of any metal that is a good conductor of electricity. The tube 1 is provided near one end thereof with an inlet nipple 2 extending radially therefrom, and the adjacent or rear end of the tube is closed by a plug 3 made of any suitable insulating material. The other or front end 4 of the tube is fully open. The tube 1 is adapted to be interposed in the pipe line extending from the receiving vat to the cooler of a milk bottling machine.

The tube 1 is adapted to occupy a horizontal or substantially horizontal position in the pipe line, and its inlet nipple 2 is adapted to be secured to the section 5 of the pipe line leading from the receiving vat and its outlet is adapted to be secured to the section 6 of the pipe line leading to the cooler. Couplings 7 are employed to secure the tube 1 to the pipe line sections 5 and 6, and the tube is insulated from the pipe line sections by sleeves 8 made from any suitable insulating material.

The tube 1 constitutes an electrode, and arranged therein is a second electrode 9. The electrode 9 is shorter than the electrode 1 and is arranged axially therein. Spiders 10, which may be made of any suitable insulating material, are employed to support the electrode 9 within the electrode 1, the spiders being suitably secured to the electrode 1 and the electrode 9 being suitably secured to the spiders. The electrode 9 extends from a point close to the discharge end 4 of the electrode 1 to a point near the transverse center thereof, and a screen 11 is arranged within the electrode 1 forwardly of the electrode 9. The electrode 1 is provided close to the front end of the electrode 9 with a nipple 12 which extends therefrom and is closed by a removable plug 13 made of any suitable insulating material. A conductor 14 extends through the plug 13 to the front end of the electrode 9. A binding post 15 is secured to the outer end of the plug 13 and is connected to the conductor 14. This binding post, and a binding post 16 carried by the nipple 12, are enclosed by a rubber cap 17.

An electric heater 18 extends into the electrode 1 from the rear end thereof, and it is secured, as at 19, in the insulating plug 3. The heater 18, which may be of any well known or appropriate construction, extends from the plug 3 to a point forwardly beyond the inlet nipple 2 and terminates short of the rear end of the electrode 9. The terminals 20 of the resistance coils of the heater 18 are arranged within a box 21 which may be secured in any suitable manner to the plug 3.

A switch 22 is provided for controlling the flow of current to the electrodes 1 and 9. This switch, which is of the single throw type, has its blade 23 connected to the binding post 15 by a conductor 24 and has its blade 25 connected to the binding post 16 by a conductor 26. The contacts 27 and 28 of the switch are connected to the blades 29 and 30 of a main switch 31 by conductors 32 and 33.

A switch 34 is provided for controlling the flow of current to the heater 18. The contacts 35 of this switch, which is of the snap type, are connected to the terminals 20 of the resistance coil of the heater 18 by conductors 36. The contacts 37 of this switch are connected to the binding posts 38 of a fuse box 39 by conductors 40. The blades of this switch are indicated at 41. The other binding posts 42 of the fuse box 39 are connected to the blade 29 and the blade 43 of the switch 31 by conductors 44.

The current is supplied to the main switch 31 by the three wire system, and the conductors 45 thereof are connected to the contacts 46 of the switch which is adapted to deliver 110-volts to each of the switches 22 and 34. The switches 31 and 22 are provided with fuses, not shown.

In practice, the milk flows through the electrode 1 on its way from the receiving vat to the cooler of the bottling apparatus, and during its passage through the electrode it surrounds the heater 18 and the electrode 9 and establishes electrical communication between the electrodes. The heater raises the temperature of the milk sufficiently to increase the activity or virulence of bacteria therein, the temperature ranging preferably from 90° to 100° F. After being heated, the milk passes through the electric field set up between the electrodes 1 and 9 by the flow of current from one of the electrodes to the other through the milk. The bacteria are destroyed in this electric field, and their destruction is greatly facilitated by their stimulation as the result of heating of the milk before it reaches the electric field. The screen 11 prevents any solid matter in the milk from passing from the apparatus to the cooler of the bottling apparatus.

While I have described the principle of the invention together with the structure which I now consider the preferred embodiment thereof, it is to be understood that the structure shown is merely illustrative and that such changes may be made, when desired, as fall within the scope of the invention as claimed.

I claim:—

1. A sterilizing apparatus comprising a tubular electrode provided with a fluid inlet and a fluid outlet, a second electrode arranged axially within said first electrode, and an electric heater arranged axially within said first electrode and spaced from said second electrode.

2. A sterilizing apparatus comprising a tubular electrode provided in its side near one end with a fluid inlet and provided at its other end with a fluid outlet, an electric heater extending axially into said electrode from said first end thereof to a point beyond said inlet, and a second electrode arranged axially within said first electrode and spaced from the inner end of the heater.

3. A sterilizing apparatus comprising a tubular electrode provided near its rear end with a fluid inlet nipple, the front end of said electrode constituting a fluid outlet, couplings carried by the nipple and front end of said electrode, means closing the rear end of said electrode, an electric heater carried by said means and extending into said electrode to a point forwardly beyond the nipple, and a second electrode arranged within the first electrode forwardly beyond the heater.

In testimony whereof I hereunto affix my signature.

ADOLPH WOODRICH.